US008640049B2

(12) United States Patent
Chung et al.

(10) Patent No.: US 8,640,049 B2
(45) Date of Patent: Jan. 28, 2014

(54) IMAGE FORMING APPARATUS, IMAGE FORMING SYSTEM, AND FUNCTION MENU ADJUSTING METHOD IN IMAGE FORMING APPARATUS

(75) Inventors: One-woong Chung, Suwon-si (KR); Sang-hyun Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 631 days.

(21) Appl. No.: 12/482,729

(22) Filed: Jun. 11, 2009

(65) Prior Publication Data

US 2010/0046020 A1 Feb. 25, 2010

(30) Foreign Application Priority Data

Aug. 19, 2008 (KR) .................................. 2008-81082

(51) Int. Cl.
*G06F 3/048* (2013.01)
*G06F 3/00* (2006.01)

(52) U.S. Cl.
USPC ........... 715/811; 715/866; 715/825; 715/815; 715/814; 715/844; 715/810; 358/1.1; 358/1.13

(58) Field of Classification Search
USPC ......... 358/1.11–1.18, 474; 399/81–85; 710/8; 702/186; 715/809–811, 744–747, 700, 715/764, 769, 770, 825, 866; 711/160
See application file for complete search history.

(56) References Cited

U.S. PATENT DOCUMENTS

| | | | |
|---|---|---|---|
| 5,564,004 A * | 10/1996 | Grossman et al. ............ | 715/835 |
| 6,614,546 B1 * | 9/2003 | Kurozasa ..................... | 358/1.15 |
| 6,856,330 B1 * | 2/2005 | Chew et al. .................... | 715/745 |
| 7,263,661 B2 * | 8/2007 | Chavers et al. ............... | 715/744 |
| 8,370,768 B2 | 2/2013 | Kubo et al. | |
| 8,422,105 B2 | 4/2013 | Nishimura | |
| 2003/0090515 A1 * | 5/2003 | Chang et al. .................. | 345/745 |
| 2005/0223324 A1 * | 10/2005 | Tashiro ........................ | 715/527 |
| 2006/0129947 A1 * | 6/2006 | Hamzy et al. ................. | 715/790 |
| 2007/0043960 A1 * | 2/2007 | Bose et al. .................... | 713/300 |
| 2007/0216965 A1 * | 9/2007 | Yoshihama .................. | 358/474 |
| 2008/0141167 A1 * | 6/2008 | Kubo et al. .................... | 715/796 |
| 2008/0163053 A1 * | 7/2008 | Hwang et al. ................. | 715/702 |

FOREIGN PATENT DOCUMENTS

| | | |
|---|---|---|
| JP | 2002-312092 | 10/2002 |
| JP | 2008-97305 | 4/2008 |

OTHER PUBLICATIONS

Korean Office Action mailed Feb. 15, 2013 for corresponding Korean Application No. 10-2008-0081082.
Korean Decision of Rejection issued Aug. 29, 2013 in corresponding Korean Patent Application No. 10-2008-0081082.
Korean Notice of Allowance issued Nov. 15, 2013 in corresponding Korean Patent Application No. 10-2008-0081082.

* cited by examiner

*Primary Examiner* — Chad Dickerson
(74) *Attorney, Agent, or Firm* — Staas & Halsey LLP

(57) ABSTRACT

An image forming apparatus includes an image forming unit to perform printing, or scanning, or copying or facsimile, or any combination thereof; a user authentication unit to authenticate a user of the image forming apparatus; a display unit to display a function menu to the authenticated user; and a controller to determine whether any function in the function menu displayed to the authenticated user has not been used for more than a reference time, and adjusting the displayed function menu to remove any function in the displayed function menu that has not been used for more than the reference time.

21 Claims, 10 Drawing Sheets

IMAGE FORMING APPARATUS, IMAGE FORMING SYSTEM, AND FUNCTION MENU ADJUSTING METHOD IN IMAGE FORMING APPARATUS

CROSS-REFERENCE TO RELATED APPLICATIONS

This application claims the benefit of Korean Patent Application No. 2008-81082 filed on Aug. 19, 2008, in the Korean Intellectual Property Office, the disclosure of which is incorporated herein by reference in its entirety.

BACKGROUND OF THE INVENTION

1. Field of the Invention

Aspects of the invention relate to an image forming apparatus, and more particularly, to an image forming apparatus that can adjust a function menu displayed on a display unit according to a frequency of use by a user, an image forming system including the image forming apparatus, and a function menu adjusting method in the image forming apparatus.

2. Description of the Related Art

Recently, an image forming apparatus, such as a printer, a scanner, a multifunctional device, or the like, tends to be provided with more and more additional functions. Accordingly, menus displayed through a user interface such as a GUI (Graphic User Interface) or through a display unit such as an LCD (Liquid Crystal Display) panel have become more and more complicated.

However, most of the additional functions of an image forming apparatus are not used very often in practice. Thus, when menus, icons, or the like for indicating all of the functions of an image forming apparatus are displayed at the same time, a user may be confused and find the image forming apparatus inconvenient to use.

SUMMARY OF THE INVENTION

Accordingly, aspects of the invention relate to providing an image forming apparatus that can adjust a function menu of the image forming apparatus according to a frequency of use by a user, an image forming system including the image forming apparatus, and a function menu adjusting method in the image forming apparatus.

According to an aspect of the invention, a function menu adjusting method in an image forming apparatus includes setting of a function by a user authenticated to use the image forming apparatus; determining whether any function in a function menu displayed to the authenticated user has not been used for more than a reference time; and adjusting the displayed function menu to remove any function that has not been used for more than the reference time.

According to an aspect of the invention, the adjusting of the function menu includes hiding the function in the displayed function menu that has not been used for more than the reference time.

According to an aspect of the invention, the adjusting of the function menu includes rearranging the displayed function menu in which the function that has not been used for more than the reference time has been hidden.

According to an aspect of the invention, the function menu includes an icon; and the rearranging of the function menu includes changing a size of the icon and/or a location of the icon, or replacing the icon with a different icon.

According to an aspect of the invention, the function menu includes text; and the rearranging of the function menu includes changing a font of the text, or a size of the text, or a location of the text, or any combination thereof.

According to an aspect of the invention, the adjusting of the function menu includes inactivating the function in the displayed function menu that has not been used for more than the reference time.

According to an aspect of the invention, the reference time is set by an administrator of the image forming apparatus or the authenticated user.

According to an aspect of the invention, the method further includes restoring the function removed by the adjusting of the displayed function menu in response to an instruction from an administrator of the image forming apparatus or the authenticated user.

According to an aspect of the invention, the restoring of the removed function includes displaying all or some function menus of the image forming apparatus at a same time according to a selection by the administrator or the authenticated user so that the removed function is distinguished from a user-selectable function; and converting the removed function into a user-selectable function.

According to an aspect of the invention, when a plurality of functions have been removed the restoring of the removed function includes converting all of the removed functions into user-selectable functions so that all of the removed functions are simultaneously restored.

According to an aspect of the invention, an image forming apparatus includes an image forming unit to perform printing, or scanning, or copying, or facsimile, or any combination thereof; a user authentication unit to authenticate a user of the image forming apparatus; a display unit to display a function menu to the authenticated user; and a controller to determine whether any function in the function menu displayed to the authenticated user has not been user for more than a reference time, and adjusting the displayed function menu to remove any the function in the displayed function menu that has not been used for more than the reference time.

According to an aspect of the invention, the controller hides the function in the displayed function menu that has not been used for more than the reference time, and rearrange the displayed function menu in which the function that has not been used for more than the reference time has been hidden.

According to an aspect of the invention, the function menu includes an icon; and the controller changes a size of the icon and/or a location of the icon, or replaces the icon with a different icon.

According to an aspect of the invention, the function menu includes text; and the controller changes a font of the text, or a size of the text, or a location of the text, or any combination thereof.

According to an aspect of the invention, the controller inactivates the function in the displayed function menu that has not been used for more than the reference time.

According to an aspect of the invention, the reference time is set by an administrator of the image forming apparatus or the authenticated user.

According to an aspect of the invention, the controller restores the function removed by the adjusting of the displayed function menu in response to an instruction from an administrator of the image forming apparatus or the authenticated user.

According to an aspect of the invention, the controller displays all or some function menus of the image forming apparatus at a same time according to a selection by the administrator or the authenticated user so that the removed function is distinguished from a user-selectable function, and converts the removed function into a user-selectable function.

According to an aspect of the invention, when a plurality of functions have been removed, the controller converts all of the removed functions into user-selectable functions so that all of the removed functions are simultaneously restored.

According to an aspect of the invention, an image forming system includes an image forming apparatus including an image forming unit to perform printing, or scanning, or copying, or facsimile or any combination thereof, a display unit to display a function menu, and a controller; and an authentication server to authenticate a user of the image forming apparatus. The controller controls the display unit to display a function menu to the authenticated user; determines whether any function in the function menu displayed to the authenticated user has not been used for more than the reference time; and adjusts the function menu to remove any function in the displayed function menu that has not been used for more than the reference time.

According to an aspect of the invention, a function menu adjusting method in an image forming apparatus includes logging in a user of the image forming apparatus; setting of a function of the image forming apparatus by the logged-in user; determining whether any function in the function menu displayed to the logged-in user has not been used for more than a reference time; and adjusting the displayed function menu to remove any function that has not been used for more than the reference time.

According to an aspect of the invention, a function menu adjusting method in an image forming apparatus includes storing information including user authentication information, function menu information about a function menu of the image forming apparatus displayed to an authenticated user of the image forming apparatus, and reference time information indicating a reference time; authenticating a user who wants to use the image forming apparatus based on the stored user authentication information; displaying the function menu of the image forming apparatus to the authenticated user based on the stored function menu information; determining whether any function in the function menu displayed to the authenticated user has not been used by the authenticated user for more than the reference time based on the stored reference time information; and adjusting the displayed function menu to remove any function that has not been used by the authenticated user for more than the reference time.

According to an aspect of the invention, the user authentication information includes user authentication information for a plurality of users of the image forming apparatus; the function menu information includes information about a same function menu of the image forming apparatus displayed to all of the users and customized for each of the users according to the respective usage preferences of the users; the reference time information indicates a plurality of reference times respectively corresponding to the users; the displaying of the function menu includes displaying the function menu customized for the user authenticated in the authenticating based on the stored function menu information; and the determining of whether any function in the function menu displayed to the authenticated user has not been used by the authenticated user for more than the reference time is performed based on the stored reference time information indicating the reference time corresponding to the user authenticated in the authenticating.

According to an aspect of the invention, the image forming apparatus is one of a plurality of information forming apparatuses connected to a network; and the authenticating, displaying, determining, and adjusting are performed when a user wants to use any of the information forming apparatuses based on the stored user authentication information, the stored function menu information, and the stored reference time information.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects of the invention will become apparent and more readily appreciated from the following description of embodiments of the invention, taken in conjunction with the accompanying drawings of which.

DETAILED DESCRIPTION OF THE EMBODIMENTS

Figure 1:
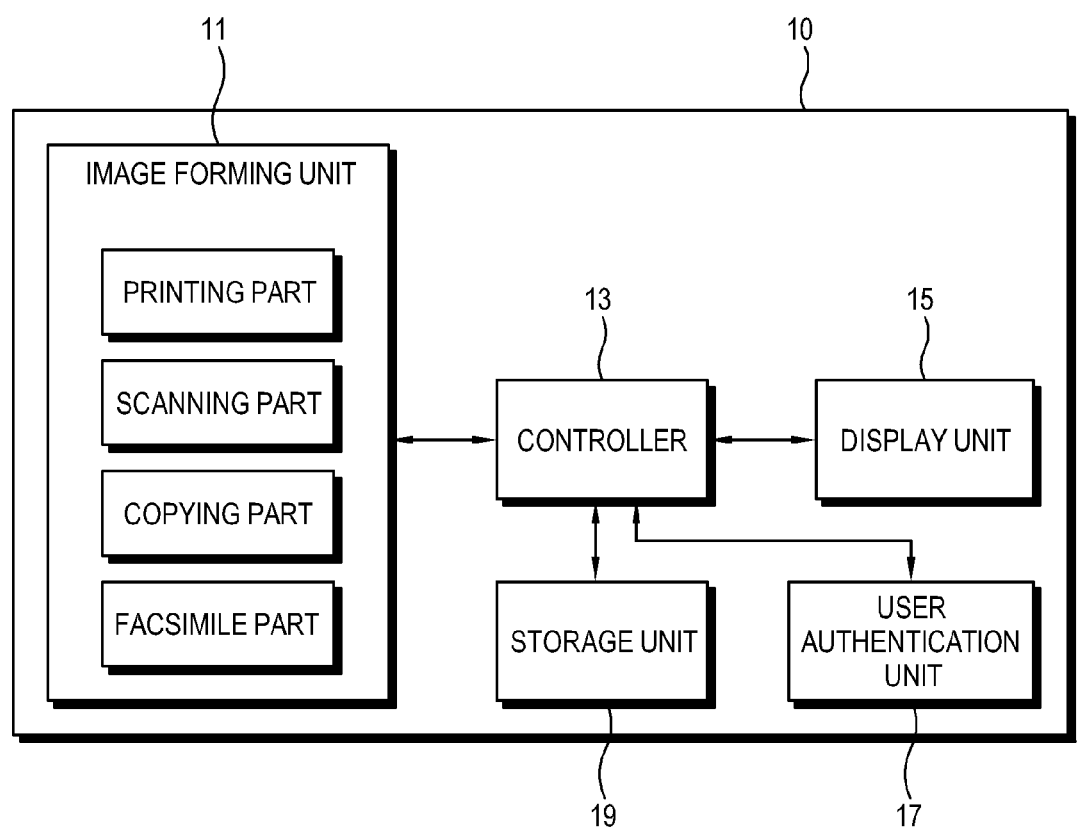
FIG. 1 is a schematic block diagram of an image forming apparatus according to an aspect of the invention.

Reference will now be made in detail to embodiments of the invention, examples of which are shown in the accompanying drawings, wherein like reference numerals refer to like elements throughout. The embodiments are described below in order to explain the invention by referring to the figures.

FIG. 1 is a schematic block diagram of an image forming apparatus according to an aspect of the invention. Referring to FIG. 1, an image forming apparatus 10 includes an image forming unit 11, a controller 13, a display unit 15, a user authentication unit 17, and a storage unit 19.

The image forming unit 11 includes at least one of a printing part, a scanning part, a copying part, and a facsimile part, and performs at least one function of printing, scanning, copying, and facsimile. The image forming unit 11 may be embodied as a multifunctional device performing at least two of the functions.

The display unit 15 displays a function menu of the image forming unit 11, and may be embodied as an LCD panel, or any other suitable display device.

The user authentication unit 17 authenticates a user who wants to adjust the function menu of the image forming unit 11.

The storage unit 19 stores therein user authentication information, information on the function menu displayed to each authenticated user, information on a reference time (to be described later), and the like.

The image forming apparatus 10 may be connected to one or more host apparatuses through a network. When one image forming apparatus 10 is connected to a plurality of host apparatuses, functions of the image forming apparatus 10 need to be independently set to be suitable for each user. To achieve this, a GUI menu screen showing the functions of the image forming apparatus 10 may be displayed on the display unit 15, through which each user can adjust the function menu according to his or her usage preferences.

Figure 2:
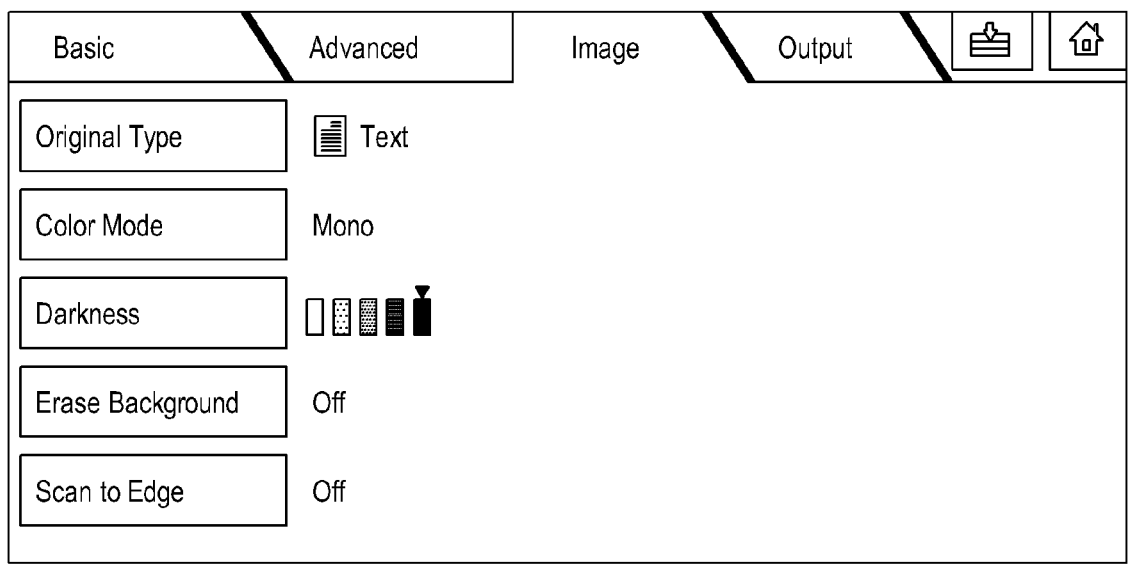
FIG. 2 shows an example of a GUI menu screen showing a scanning function of the image forming apparatus.
Figure 3:
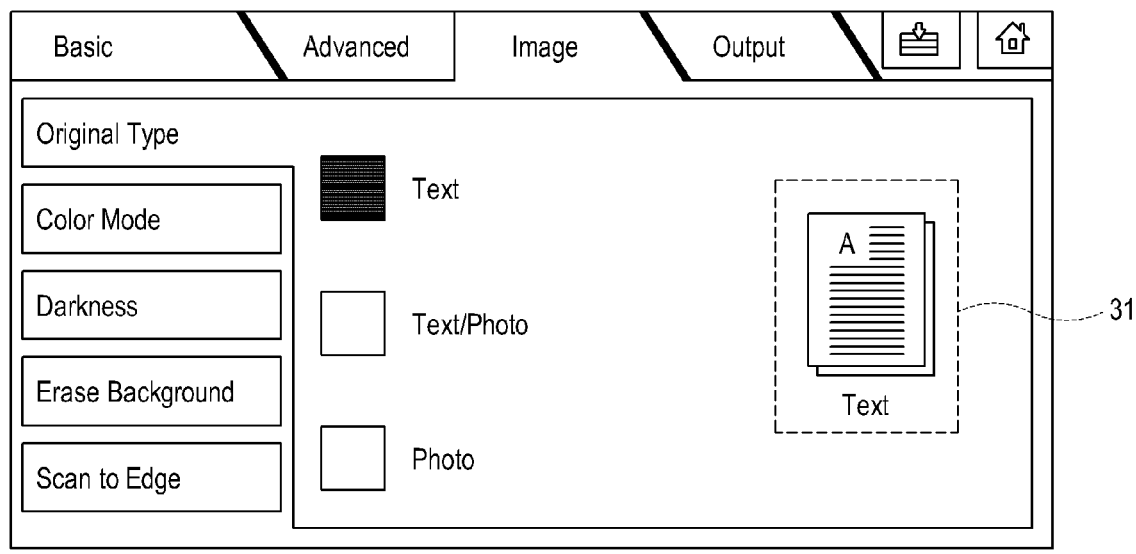
FIG. 3 shows an example of a GUI menu screen showing sub functions of an intermediate function 'Original Type' in FIG. 2.

FIG. 2 shows an example of a GUI menu screen showing a scanning function of the image forming apparatus 10, and FIG. 3 shows an example of a GUI menu screen showing functions of 'Original Type' in FIG. 2.

Referring to FIG. 2, a main function menu includes, for example, four main functions 'Basic', 'Advanced', 'Image', and 'Output', which are provided in a multi-page view format. As shown in FIG. 2, if a third main function 'Image' is selected in the main function menu, an intermediate function menu including five intermediate functions 'Original Type', 'Color Mode', 'Darkness', 'Erase Background', and 'Scan to Edge' is displayed. Then, if a first intermediate function 'Original Type' is selected in the intermediate function menu, a sub function menu including three sub functions 'Text', 'Text/Photo', and 'Photo' is displayed as shown in FIG. 3.

Displaying all of the GUI menu screens in this way without considering a frequency of use of the functions by a user may confuse the user and make the image forming apparatus 10 inconvenient to use as described above. To prevent this problem, the controller 13 removes any function in the function menu that has not been used for more than a reference time.

To this end, the controller 13 first authenticates a user who wants to adjust the function menu of the image forming apparatus 10. The user authentication unit 17 authenticates the user based on user authentication information stored in the storage unit 19. The user authentication information may include user log-in information, information obtained from an authentication card, or the like.

Then, the controller 13 determines whether any of the functions in the function menu displayed to the authenticated user have not been used for more than the reference time based on function menu information for the authenticated user stored in the storage unit 19. The reference time may be set by an administrator of the image forming apparatus 10, or the authenticated user, or may be set as a default value. Further, the controller 13 adjusts the function menu displayed through the display unit 15 if to remove any of the functions in the function menu that have not been used for more than the reference time. By removing any function has a low frequency of use from the function menu and adjusting the function menu in this way, the GUI menu screens can be simplified and customized according to the usage preferences of each authenticated user.

A function menu adjusting method in an image forming apparatus according to an aspect of the invention will now be described in more detail with reference to FIGS. 4 through 9.

Figure 4:
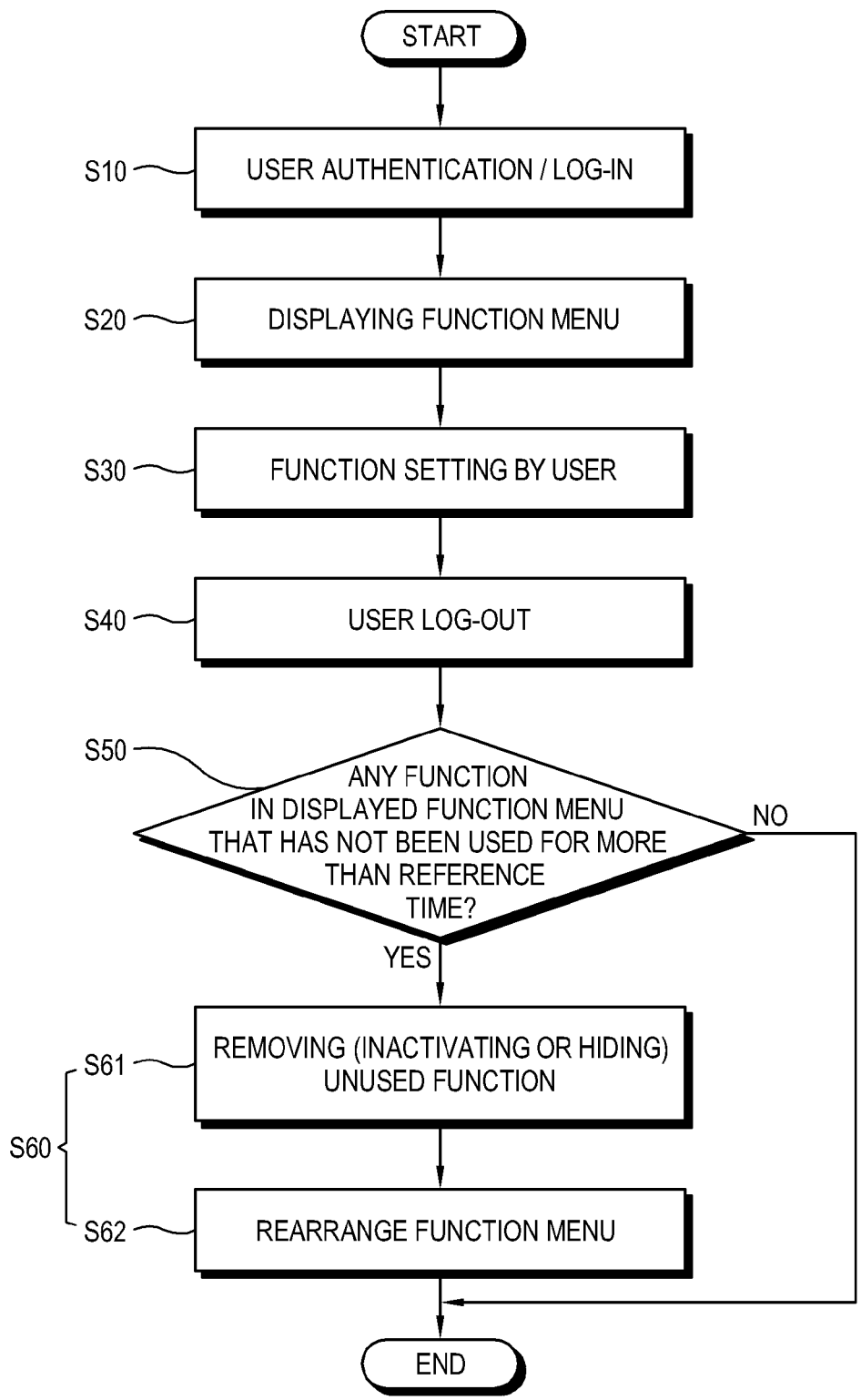
FIG. 4 is a flowchart of a function menu adjusting method in an image forming apparatus according to an aspect of the invention.

Referring to FIG. 4, a method according to an aspect of the invention includes authenticating a user through the user authentication unit 17 (S10); displaying a function menu including a plurality of functions (S20); setting of a function in the function menu by the authenticated user (S30); determining whether any of the functions in the function menu have not been used for more than the reference time (S50); and adjusting the function menu to remove any of the functions have not been used for more than the reference time (S60).

The user authentication (S10) may be performed through a user log-in based on user log-in information. In this case, a user log-out (S40) may be performed between operations S30 and S50 so that the determining (S50) can be performed after the function setting by the user (S30) is completed. Alternatively, the user authentication (S10) may be performed based on an IP address of a user computer, or other methods known in the art.

The function setting by the user (S30) is performed to set or change a function in the displayed function menu. For example, referring to FIG. 3, if a user wants to change a sub function 'Text' in 'Original Type' to another sub function 'Photo', a user sequentially selects the icons in the order of 'Image', 'Original', and 'Photo', causing a text icon 31 to be changed to an icon representing the sub function 'Photo' as shown in FIG. 3.

According to another aspect of the invention, the function setting may be previously performed by an administrator of the image forming apparatus 10. That is, the function is preset by the administrator and then stored in the storage unit 19. In this case, in operation S20, the function preset by the administrator may be displayed to the user. Thus, operation S30 may be omitted.

Operation S50 is performed to determine whether any of the functions set by the user or the administrator have not been used for more than the reference time. The reference time may be set by the user or the administrator, or may be set as a default value.

Further, the reference time may be commonly set for all of the functions, or may be independently set for each function. For example, referring to FIG. 3, the reference time may be set to 30 days for the sub function 'Text/Photo', 31 days for the sub function 'Photo', and 35 days for the intermediate function 'Original Type'.

Operation S60 is performed to remove a function that has not been used for more than the reference time and to adjust the function menu in accordance with the removed function. Operation S60 may include hiding or inactivating a function that has not been used for more than the reference time (S61).

Figure 5:
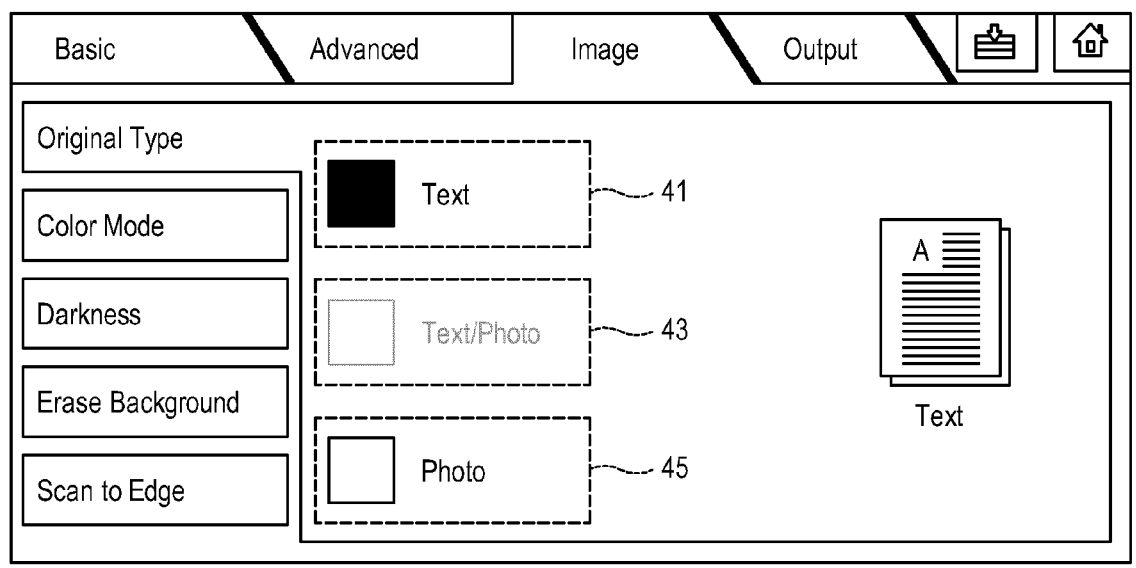
FIGS. 5 through 8 show an example of a GUI menu screen showing a function menu adjusting method according to an aspect of the invention, respectively.

For example, if the sub function 'Text/Photo' has not been used for more than the reference time, for example, 30 days, the sub function 'Text/Photo' may be inactivated as indicated by the grayed-out icon indicated by reference numeral 43 in FIG. 5. In contrast, the other sub functions 'Text' and 'Photo' that have been used within the reference time remain activated as indicated by the normal icons indicated by reference numerals 41 and 45 in FIG. 5.

Figure 6:
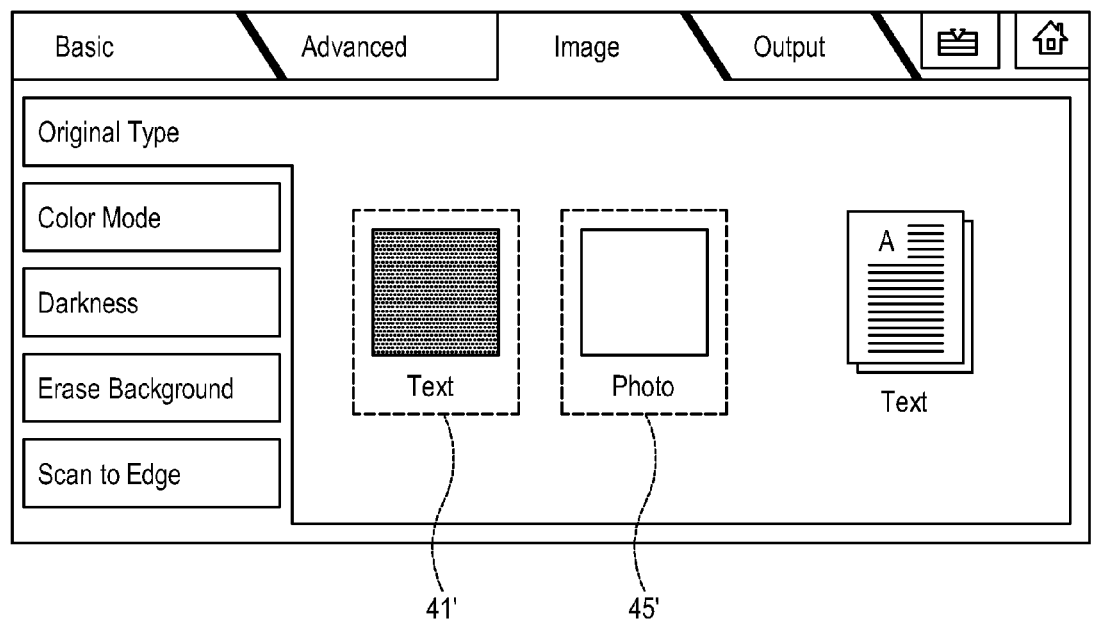

Alternatively, in operation S61, the function that has not been used for more than the reference time may be removed from the function menu by being hidden as shown in FIG. 6, in which the sub function 'Text/Photo' shown in FIG. 5 has been hidden.

Operation S60 may further include rearranging the function menu after removing or hiding the unused function (S62). For example, the sub functions 'Text' and 'Photo' may be rearranged in a horizontal arrangement as indicated by reference numerals 41' and 45' in FIG. 6 from the vertical arrangement in FIG. 5.

Figure 8:
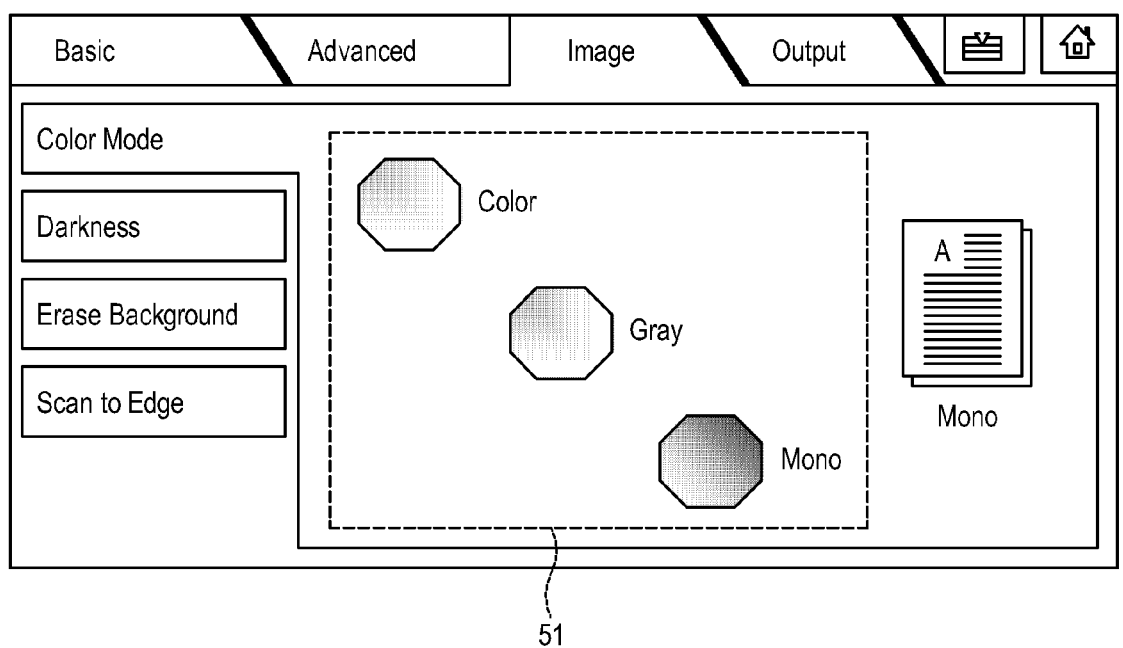

If the function menu includes text, the function menu may be rearranged by changing one or more of a font, a size, and a location of the text. If the function menu includes an icon, the function menu may be rearranged by changing one or both of a size and a location of the icon, or by replacing the icon with a different icon as indicated by reference numeral 51 in FIG. 8. FIG. 8 shows an example in which the intermediate function 'Original Type' in FIG. 5 has been removed, and the icons indicated by reference numerals 41, 43, and 45 in FIG. 5 for the intermediate function 'Original Type' have been replaced with the icon indicated by reference numeral 51 in FIG. 8 for the intermediate function 'Color Mode'.

Figure 7:
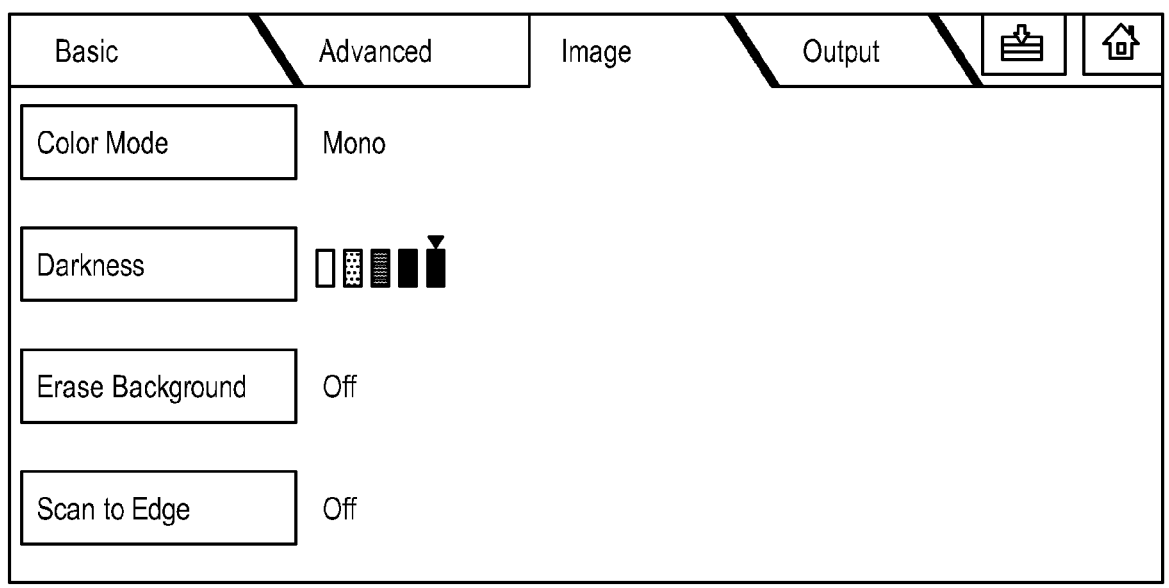

It should be understood that operation S60 may be applied to all kinds of function menus, that is, the main, intermediate, and sub function menus. For example, if all of the sub functions in the intermediate function 'Original Type' in FIG. 3 have not been used for more than the reference time, the intermediate function 'Original Type' in the intermediate function menu may be removed as shown in FIGS. 7 and 8. In this case, the other intermediate functions 'Color Mode', 'Darkness', 'Erase Background', and 'Scan to Edge' in the intermediate menu may be rearranged to fill a space obtained by removing the intermediate function 'Original Type'.

Further, a method according to an aspect of the invention may include restoring functions removed in operation S60 to the function menu. The restoring may include displaying all of the menus or functions at the same time, and converting some or all of the removed functions into a user-selectable functions.

Figure 9:
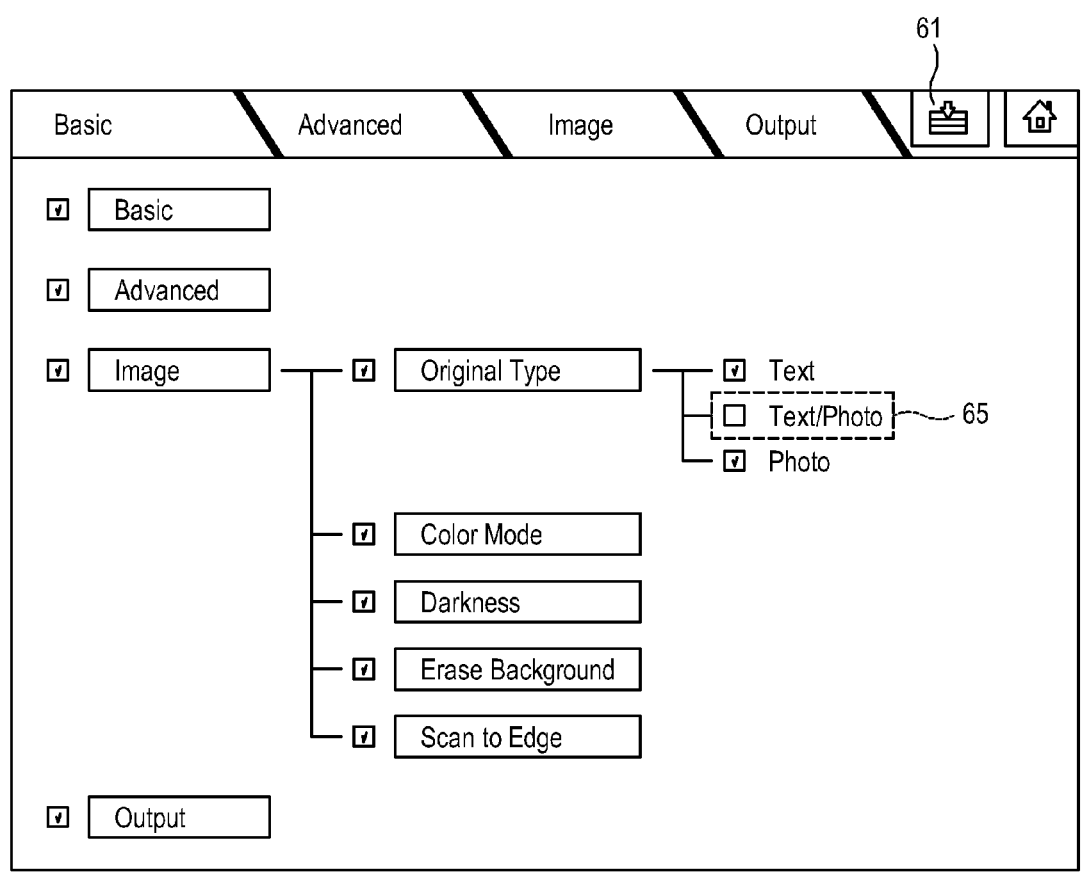
FIG. 9 shows an example of a GUI menu screen showing a restoring process according to an aspect of the invention.

FIG. 9 shows an example of a GUI menu screen showing a restoring operation according to an aspect of the invention. Referring to FIG. 9, a restoring icon 61 is shown as being provided in an upper right corner of the GUI menu screen, but may be provided at any desired location in the GUI menu screen. If an administrator or a user selects this icon 61, all of the menus or functions may be displayed at the same time. Alternatively, only some of the menus or functions may be displayed at the same time according to a user selection. For example, the intermediate functions 'Original Type', 'Color Mode', 'Darkness', 'Erase Background', and 'Scan to Edge' and the sub functions 'Text', 'Text/Photo', and 'Photo' may be displayed as shown in FIG. 9 if an administrator or a user selects functions in the order of 'Image' and 'Original' Type'.

Further, the removed function, for example, 'Text/Photo', may be displayed so that it can be distinguished from the user-selectable functions, i.e., functions that are available to be selected by a user, for example, by using a check box without a check mark in it as indicated by reference numeral 65 in FIG. 9. All of the other displayed functions have a check box with a check mark in it to indicate that they are user-selectable functions. Then, the menu converting operation may be performed by changing the state of the check box of the removed 'Text/Photo' sub function to display a check mark to convert the removed function into a user-selectable function. However, it is understood that any other method of distinguishing the user-selectable functions from the removed functions may be used.

Further, the restoring operation may include converting all of the removed functions into user-selectable functions. For example, if the restoring icon 61 is selected, all of the removed functions may be converted into user-selectable functions.

In the above-described embodiments, the GUI menu screens are displayed on the display unit 15 in FIG. 1 of the image forming apparatus 10 in FIG. 1, but the GUI menu screens may be displayed on any other display unit provided in a host apparatus (not shown) connected to the image forming apparatus 10, such as a computer workstation.

Figure 10:
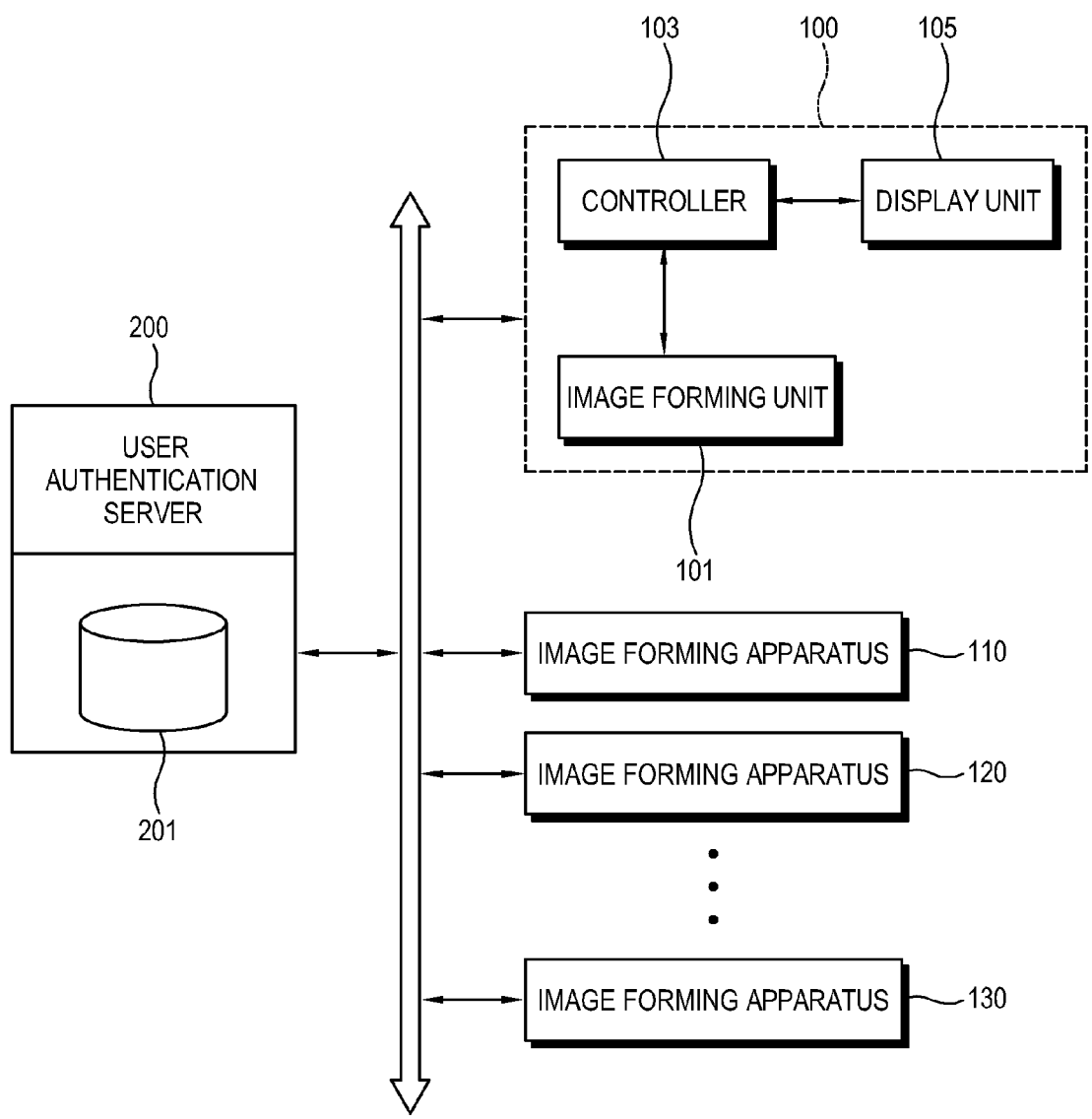
FIG. 10 is a schematic block diagram of an image forming system according to an aspect of the invention.

According to another aspect of the invention, a computer-readable medium stores a computer program for executing a function menu adjusting method according to an aspect of the invention. Examples of such a computer-readable medium including, but are not limited to, storage media such as solid-state storage media (ROM, RAM, EEPROM, flash, etc.), magnetic storage media (e.g., floppy discs, hard drives, etc.), and optical storage media (e.g., CD-ROMs, DVDs, Blu-ray discs, etc.). The computer-readable medium may be dispersively installed in a computer system connected to a network, and stored and executed as computer-readable code by a distributed computing environment. For example, the controller 13 in FIG. 1 may be implemented as computer-readable instructions stored on a computer-readable medium for executing a function menu adjusting method according to an aspect of the invention, such as the function menu adjusting method described above with respect to FIGS. 2 to 9, on a general-purpose computer, a special-purpose computer, a processor, an application-specific integrated circuit (ASIC), or any other suitable processing device FIG. 10 is a block diagram of an image forming system according to an aspect of the invention. Referring to FIG. 10, the image forming system includes an image forming apparatus 100 which includes an image forming unit 101, a controller 103, and a display unit 105; and a user authentication server 200 to authenticate a user who wants to set a function of the image forming unit 101 through the display unit 105. The image forming apparatus 100 is the same as the image forming apparatus 10 in FIG. 1 that performs the function menu adjusting method described above with reference to FIGS. 2 through 9.

The user authentication server 200 is connected to the image forming apparatus 100 through a network, and includes a database 201 for function menu management. The database 201 stores user authentication information, function menu information, reference time information, removed menu information, and the like for each authenticated user.

The controller 103 of the image forming apparatus 100 authenticates a user through the user authentication server 200, and determines whether any functions in a function menu displayed to the authenticated user have not been used for more than the reference time. If any of the functions in the function menu displayed to the authenticated user have not been used for more than the reference time, the controller 13 adjusts the function menu displayed on the display unit 105 to remove any function that has not been used for more than the reference time as described above with reference to FIGS. 2 to 9.

The image forming system in FIG. 10 may further include a plurality of image forming apparatuses 110, 120, and 130 in addition to the image forming apparatus 100. A user may access any of the image forming apparatuses 110, 120, and 130, and accordingly, the user authentication server 200 may authenticate the user and then provide GUI menu screens customized according to the authenticated user's usage preferences as described above with reference to FIGS. 2 through 9 regardless of which one of the image forming apparatuses 100, 110, 120, and 130 the user is accessing. That is, the same GUI menu screens can be displayed to the authenticated user regardless of which one of the image forming apparatuses 100, 110, 120, and 130 the user is accessing. However, the image forming apparatuses 100, 110, 120, and 130 are different types of image forming apparatuses having different combinations of functions, the authenticated user may have different usage preferences for each of the image forming apparatuses 100, 110, 120, and 130. In this case, different GUI menu screens customized according to the authenticated user's usage preferences may be displayed for each of the image forming apparatuses 100, 110, 120, and 130.

As described above, in an image forming apparatus and a function menu adjusting method according to aspects of the invention, a function that has not been used by an authenticated user for more than a reference time is removed by being inactivated or hidden to provide a simplified GUI menu screen for that authenticated user, thereby enhancing user convenience. Further, an administrator of the image forming apparatus can compile information on the frequency of use of functions by different authenticated users into a database and analyze the information to provide an optimized GUI menu screen that takes into account the usage preferences of the different authenticated users.

In an image forming system according to an aspect of the invention, when an authenticated user wants to set a function in any one of a plurality of image forming apparatuses connected to a network, the same GUI menu screens can be conveniently provided to the authenticated user regardless of which image forming apparatus the user is accessing.

Although several embodiments of the invention have been shown and described, it will be appreciated by those skilled in the art that changes may be made in these embodiments without departing from the principles and spirit of the invention, the scope of which is defined in the claims and their equivalents.

What is claimed is:

1. A function menu adjusting method in an image forming apparatus, comprising:
    setting of a function by a user authenticated to use the image forming apparatus;
    determining, for each of a plurality of functions in a function menu displayed to the authenticated user, whether any of the plurality of functions has not been used for more than a reference time; and
    adjusting the displayed function menu to remove any of the plurality of functions in the displayed function menu has not been used for more than the reference time;
    wherein the adjusting of the function menu comprises hiding the function in the displayed function menu that has not been used more than the reference time among the plurality of functions; and
    wherein each function has an independently set different reference time set in a unit of days.

2. The method of claim 1, wherein the adjusting of the function menu further comprises rearranging the displayed function menu in which the function that has not used for more than the reference time has been hidden.

3. The method of claim 2, wherein:
    the function menu comprises an icon; and
    the rearranging of the function menu comprises changing a size of the icon and/or a location of the icon, or replacing the icon with a different icon.

4. The method of claim 2, wherein:
    the function menu comprises text; and
    the rearranging of the function menu comprises changing a font of the text, or a size of the text, or a location of the text, or any combination thereof.

5. The method of claim 1, wherein the adjusting of the function menu comprises inactivating the function in the displayed function menu that has not been used for more than the reference time.

6. The method of claim 1, wherein the reference time is set by an administrator of the image forming apparatus or the authenticated user.

7. The method of claim 1, further comprising restoring the function removed by the adjusting of the displayed function menu in response to an instruction from an administrator of the image forming apparatus or the authenticated user.

8. The method of claim 7, wherein the restoring of the removed function comprises:
    displaying all or some function menus of the image forming apparatus at a same time according to a selection by the administrator or the authenticated user so that the removed function is distinguished from a user-selectable function that has not been removed; and
    converting the removed function into a user-selectable function.

9. The method of claim 7, wherein when a plurality of functions have been removed, the restoring of the removed function comprises converting all of the removed functions into user-selectable functions so that all of the removed functions are simultaneously restored.

10. An image forming apparatus comprising:
    an image forming unit to perform printing, or scanning, or copying, or facsimile, or any combination thereof;
    a user authentication unit to authenticate a user of the image forming apparatus;
    a display unit to display a function menu to the authenticated user; and
    a controller to determine, for each of a plurality of functions in the function menu displayed to the authenticated user has not been used for more than a reference time, and adjusting the displayed function menu to remove any of the plurality of functions in the displayed function menu that has not used for more than the reference time;
    wherein the controller hides the function in the displayed function menu that has not been used for more than the reference time among the plurality of functions; and
    wherein each function has an independently set different reference time set in a unit of days.

11. The apparatus of claim 10, wherein the controller rearranges the displayed function menu in which the function that has not used for more than the reference time has been hidden.

12. The apparatus of claim 11, wherein:
    the function menu comprises an icon; and
    the controller rearranges the displayed function menu by changing a size of the icon and/or a location of the icon, or replacing the icon with a different icon.

13. The apparatus of claim 11, wherein:
    the function menu comprises text; and
    the controller rearranges the displayed function menu by changing a font of the text, or a size of the text, or a location of the text, or any combination thereof.

14. The apparatus of claim 10, wherein the controller inactivates the function in the displayed function menu that has not been used for more than the reference time.

15. The apparatus of claim 10, wherein the reference time is set by an administrator of the image forming apparatus or the authenticated user.

16. The apparatus of claim 10, wherein the controller restores the function removed by the adjusting of the displayed function menu in response to an instruction from an administrator of the image forming apparatus or the authenticated user.

17. The apparatus of claim 16, wherein the controller displays all or some function menus of the image forming apparatus at a same time according to a selection by the administrator or the authenticated user so that the removed function is distinguished from a remaining user-selectable function, and converts the removed function into a user-selectable function.

18. The apparatus of claim 16, wherein when a plurality of functions have been removed, the controller converts all of the removed functions into user-selectable functions so that all of the removed functions are simultaneously restored.

19. An image forming system comprising:
    an image forming apparatus comprising: an image forming unit to perform printing, or scanning, or copying, or facsimile, or any combination thereof;
    a display unit to display a function menu; and
    a controller; and
    an authentication server to authenticate a user of the image forming apparatus;
    wherein the controller:
        controls the display unit to display a function menu to the authenticated user;
        determines, for each of a plurality of functions in the function menu displayed to the authenticated user, whether any function has not been used for more than a reference time; and adjusts the displayed function menu to remove any of the plurality of functions in the displayed function menu has not been used for more than the reference time, wherein the adjusting of the function menu comprises hiding the function in the displayed function menu that has not been used for more than the reference time among the plurality of functions; and wherein each function has an independently set different reference time set in a unit of days.

20. A function menu adjusting method in an image forming apparatus, comprising:

logging in a user of the image forming apparatus;

displaying a function menu of the image forming apparatus to the logged-in user setting of a plurality of functions of the image forming apparatus by the logged-in user;

determining, for each of the plurality of functions in the function menu displayed to the logged-in user, whether any function has not been used for more than a reference time; and adjusting the displayed function menu to remove any function that has not been used for more than the reference time, wherein the adjusting of the function menu comprises hiding the function in the displayed function menu that has not been used for more than the reference time among the plurality of functions; and wherein each function has an independently set different reference time set in a unit of days.

21. A function menu adjusting method in an image forming apparatus, comprising:

storing information comprising:

user authentication information;

function menu information about a function menu of the image forming apparatus displayed to an authenticated user of the image forming apparatus; and reference time information indicating a reference time;

authenticating a user who wants to use the image forming apparatus based on the stored user authentication information;

displaying the function menu of the image forming apparatus to the authenticated user based on the stored function menu information;

determining, for each of a plurality of functions in the function menu displayed to the authenticated user, whether any of the plurality of functions has not been used by the authenticated user for more than the reference time based on the stored reference time information; and adjusting the displayed function menu to remove any of the plurality of functions that has not been used by the authenticated user for more than the reference time, wherein the adjusting of the function menu comprises hiding the function in the displayed function menu that has not been used for more than the reference time among the plurality of functions; and wherein each function has an independently set different reference time set in a unit of days.

\* \* \* \* \*

UNITED STATES PATENT AND TRADEMARK OFFICE
CERTIFICATE OF CORRECTION

PATENT NO. : 8,640,049 B2
APPLICATION NO. : 12/482729
DATED : January 28, 2014
INVENTOR(S) : Chung et al.

It is certified that error appears in the above-identified patent and that said Letters Patent is hereby corrected as shown below:

On the Title Page Item [56] (OTHER PUBLICATIONS), Line 7, insert -- Korean Notice of Office Action issued November 28, 2013 in corresponding Korean Patent Application No. 10-2013-0128608 --.
On the Title Page Item [57] (Abstract), Line 2, delete "copying" and insert -- copying, --, therefor.

In the Claims

Column 9, Line 31, In Claim 2, delete "has not" and insert -- has not been --, therefor.
Column 10, Line 13, In Claim 10, delete "has not" and insert -- has not been --, therefor.
Column 10, Line 21, In Claim 11, delete "has not" and insert -- has not been --, therefor.

Signed and Sealed this
First Day of July, 2014

Michelle K. Lee
*Deputy Director of the United States Patent and Trademark Office*